United States Patent Office 3,346,609
Patented Oct. 10, 1967

---

3,346,609
BIS-SILYLATED UREIDO COMPOUNDS AND PROCESS THEREFOR
Johann F. Klebe, Schenectady, N.Y., assignor to General Electric Company, a corporation of New York
No Drawing. Filed May 28, 1964, Ser. No. 371,119
12 Claims. (Cl. 260—448.2)

This invention is concerned with silylated ureido compounds and methods for preparing the same. More particularly the invention relates to silylated ureido compounds selected from the class consisting of compositions of the formulas (I)
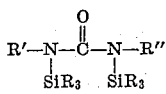

and (II)
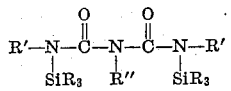

and a process for making said compositions which comprises effecting reaction between a bis-triorganosilyl amine of the formula (III) 

and an organic isocyanate of the formula (IV) R'NCO where R, R', and R'' are either the same or different monovalent hydrocarbon radicals.

Among the radicals which R, R' and R'' may be are, for instance, alkyl radicals (e.g., methyl, ethyl, propyl, isopropyl, pentyl, octyl, dodecyl, etc., radicals); aryl radicals (e.g., phenyl, naphthyl, biphenyl, etc., radicals); aralkyl radicals (e.g., benzyl, phenylethyl, etc., radicals); alkaryl radicals (e.g., xylyl, tolyl, ethylphenyl, methylnaphthyl, etc., radicals); cycloaliphatic, including unsaturated radicals (e.g., cyclopentyl, cyclohexyl, cyclopentenyl, cyclohexenyl, etc., radicals); unsaturated acyclic aliphatic radicals (e.g., vinyl, allyl, methallyl, etc., radicals); etc.

Among the isocyanates which may be employed in the practice of the present invention are, for instance, ethyl isocyanate, isopropyl isocyanate, butyl isocyanate, phenyl isocyanate, toluene isocyanate, naphthalene isocyanate, xylene isocyanate, isocyanato diphenyl oxide, isocyanato diphenyl methane, etc. The presence of inert substituents on the aryl nucleus of the aryl isocyanates, for example, halogens (e.g., chlorine, bromine, etc.) nitro group, cyano group, ester groups, as well as other hydrocarbon radicals such as alkyl, aryl, aralkyl, alkaryl, etc., radicals, is not precluded.

Typical of the disilylated amines which may be employed are, for instance, N,N-bis(trimethylsilyl)aminomethane, N,N-bis(triphenylsilyl)aminoethane, N,N-bis(trimethylsilyl)aniline, N,N - bis(trimethylsilyl)aminodiphenyl, N,N-bis(triethylsilyl)aminobutane, N,N-bis(trimethylsilyl)aminopropane, etc.

In forming the ureido compound, it is usually only necessary to bring the organic isocyanate in contact with the bis-triorganosilylamine. The molar concentrations of the reactants can be varied widely. Generally, in order to form the disilylated urea of Formula I, one employs essentially 1 mol of the organoisocyanate with 1 mol of the bis-triorganosilylamine. To make the silylated biuret, one method comprises reacting about 2 mols of the organic isocyanate per mol of the disilylated amine. Excess molar concentrations of either the reactants equal to from 10 to 20 mol percent is not precluded. Although the reaction proceeds for the most part at room temperature (about 25–30° C.), the use of heat, for instance, temperatures of 50–150° C., in order to accelerate the formation of the ureido compounds can advantageously be employed. Generally the reaction is completed in from 5 minutes to several hours.

In order that those skilled in the art may better understand how the present invention may be practiced, the following examples are given by way of illustration and not by way of limitation. Anhydrous conditions were observed in all the examples. When analyses are given, the figures in parentheses are the theoretical values for the elements. All parts are by weight unless otherwise stated.

*Example 1*

The compound N,N-bis(trimethylsilyl)aniline was prepared as follows: To a solution of 33 grams (0.2 mol) N-trimethylsilylaniline (prepared by reacting aniline with trimethylchlorosilane in equimolar ratios) in 100 cc. of dry tetrahydrofuran was added with stirring under anhydrous conditions 200 cc. of a 10 percent solution of butyl lithium in hexane. Butane was evolved and the mixture warmed up to the reflux temperature during the addition which was completed within 30 minutes. To the resulting solution was slowly added 33 grams (0.3 mol) trimethylchlorosilane at which point the reaction became exothermic and a white precipitate of lithium chloride formed. The mixture was then stirred for about 15 hours at room temperature, and thereafter the filtrate was distilled to give N,N-bis(trimethylsilyl) aniline having the formula (VI) 

This material boiled at 72° C./2.6 mm. and was a colorless mobile liquid having a refractive index $n_D^{20} = 1.4840$.

*Example 2*

In this example, 12.9 parts of the N,N-bis(trimethylsilyl)aniline of Example 1 was mixed with 9.6 parts phenylisocyanate (50 mol percent excess) and heated at 145° C. in an atmosphere of nitrogen for about 48 hours. On cooling the mixture crystallized partially. Five parts dry hexane was added to dissolve the product, any insoluble material removed by filtration, and the solution thus obtained was allowed to crystallize at −15° C. There was thus obtained N,N'-diphenyl-N,N'-bis(trimethylsilyl) urea having the formula (VII) 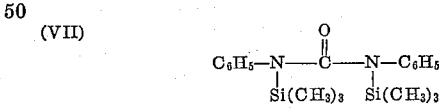

which melted at 57–59° C. and which on analysis was found to have the following values: C, 64.1% (64.0%); H, 8.2% (7.9%); N, 8.1% (7.9%); Si, 16.0% (15.7%).

*Example 3*

To 8.7 parts of N-methylhexamethyldisilazane (prepared by the process of Osthoff and Kantor, Inorg. Synth., 5, 55) was added with stirring 6.0 parts phenylisocyanate. The dropwise addition resulted in an exothermic reaction and was completed within 20 minutes. Stirring was continued at 35° C. for about 15 hours. The colorless liquid thus obtained was subjected to molecular distillation to yield the compound N-methyl-N'-phenyl-N,N'-bis(trimethylsilyl)urea whose identity was established by the following analyses:

C, 56.6% (57.0%); H, 8.9% (8.9%); N, 9.8% (9.5%); Si, 19.3% (19.0%).

This compound had the formula:

(VIII)
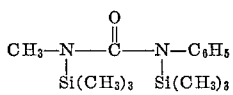

Example 4

A mixture of four parts of N-methylhexamethyldisilazane having the formula, $$CH_3\text{—}N[Si(CH_3)_3]_2$$

and 1.6 parts of freshly distilled methylisocyanate (20 mol percent excess) was stirred for 24 hours at 35° C. The resulting fluid was fractionally distilled to obtain one fraction A boiling at 55–58° C./0.1 mm. and another fraction B boiling at 96–98° C./0.1 mm. Fraction A was identified as being N,N'-dimethyl-N,N'-bis(trimethylsilyl)urea melting at 22–23° C. and having a refractive index $n_D^{20}$=1.4523. Its identity was established by the following analyses:

C, 46.5% (46.4%); H, 10.6% (10.4%); N, 12.3% (12.0%); Si, 23.9% (24.2%).

Fraction B was a colorless liquid having a refractive index $n_D^{20}$=1.4729. This material was identified as N,N',N''-trimethyl-N,N''-bis(trimethylsilyl)biuret having the formula (IX)
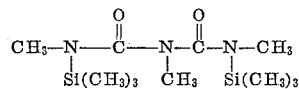

which was established to be the above compound by the following analyses:

C, 45.8% (45.6%); H, 9.4% (9.4%); N, 14.8% (14.5%); Si, 19.4% (19.4%).

Example 5

In this example, a mixture of 2.37 parts N-methyl-N'-phenyl - N,N'-bis(trimethylsilyl)urea (prepared in Example 3) and 0.95 part phenylisocyanate was allowed to stand at 35° C. with stirring for 20 hours under anhydrous conditions. A white solid was formed at the end of this time which when recrystallized from dry n-hexane melted at 104–105° C. Analysis of this compound showed it to be N,N'' - diphenyl-N'-methyl-N,N''-bis-(trimethylsilyl)biuret having the formula (X)
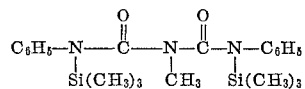

as established by the following analyses:

C, 61.3% (61.0%); H, 8.2% (7.6%); N, 10.6% (10.2%); Si, 13.6% (13.6%).

As noted in the foregoing examples, biuret derivatives can be obtained by either reacting 2 mols of the isocyanate with 1 mol of the bis-triorganosilylamine and obtaining the desired biuret derivative directly without isolation of the disilyl urea; or alternatively, the disilyl biuret and particularly unsymmetrical disilyl biurets (i.e., biurets containing different hydrocarbon radicals, on the N, N' and N'' atoms) may be obtained by reaction of the same or different isocyanates with the intermediate disilyl urea. This can be readily illustrated by the following equation in which R, R', and R'', have the meanings given above and R''' is also a hydrocarbon radical of the same scope as R, R', and R'':

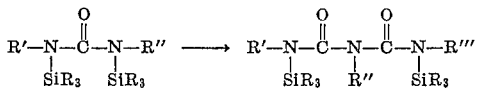

It will of course be apparent to those skilled in the art that in addition to the organic isocyanates used above and the triorganosilyl amines used in the foregoing examples, other organic isocyanates and silylated amines may be employed, many examples which have been given above, without departing from the scope of the invention. Obviously the conditions of reaction and the proportions of the ingredients may be varied widely depending upon such factors as the reactants involved, the type of reaction product desired, etc.

The disilyl substituted ureas and biuret derivatives of the present invention are useful as lubricants and hydraulic transmission media. Frequently they have physiological effects and act as hypnotics and anticonvulsants. Furthermore, they may be used as pesticides, insecticides and miticides. These materials are also useful for the treatment of leather and fabrics for modification of water absorption, shrinkage and dyeing properties. They add water repellency and a waxy surface feel when used for the treatment of paper.

In addition, disilylureas and disilylbiurets, especially those containing aromatic groups, are useful as silyl transfer agents for the silylation of hydroxyl functions, amine and amide functions. In this respect, they are much more powerful than the conventional silylating agents such as silylamines and silazanes in that the silylation with disilylureas and disilylbiurets takes place at room temperature and within very short times (for instance, 5 minutes) compared with temperatures of around 80 to 150° C. and reaction times of several hours or longer when silylamines or silazanes are used. Because of the presence of two silyl groups as silylating agents, their silylation capacity on a weight ratio is twice that of monosilyl ureas often used for the same purpose.

The silylation reaction is often desired in order to make derivatives of mixtures of compounds which are difficultly separable from each other because of a high degree of hydrogen bonding which does not permit separation of the individual components by distillation; on the other hand the silyl derivatives of many compounds have sufficiently lower boiling points thereby permitting ready distillation or other physical separation. The silylated ureas and biurets can be readily hydrolyzed to the corresponding urea or biuret of high purity. Further instances of using these silylated ureas as silylating agents are found in my copending application, Ser. No. 371,095, filed May 28, 1964, now abandoned, and assigned to the same assignee as the present invention.

As a further example, mere mixing of a disilylurea, e.g., N,N'-bis(trimethylsilyl)-N,N'-diphenylurea, with a dipeptide, like N-methyl-DL-alanylglycin, in a suitable solvent such as acetonitrile, yields the trisilylpeptide:

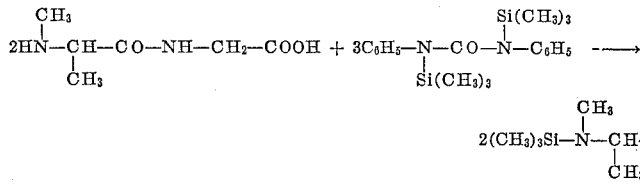

Such trisilylpeptides may then be used for the preparation of polypeptides.

Another example is the silylation of a sugar, like sucrose, which may be effected by mixing of 3 mols of a disilylbiuret like 1,5-diphenyl-3-methyl-1,5-bis(trimethylsilyl)biuret with 1 mol of sucrose in pyridine at room temperature, resulting in the formation of hexa-O-trimethylsilylsucrose within several minutes, which then may be separated from impurities by distillation. Hydrolysis with aqueous alcohol affords the purified sucrose.

The 1,5-diphenyl-3-methylbiuret obtained as a byproduct in this reaction, as well as other biuret or urea derivatives obtained by exchange of silyl groups with hydrogen, are in themselves useful substances in that they possess pesticidal and bacteriocidal activity.

The preparation of disilyl substituted biuret derivatives with three different radicals in the 1, 3, and 5 positions

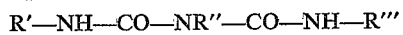

or with two like radicals in the 1 and 5 positions and a different one in the 3 position

and subsequent hydrolysis to the parent biurets $$R'—NH—CO—NR''—CO—NH—R'''$$

and $$R'—NH—CO—NR''—CO—NH—R'$$

where R, R', R'' and R''' have the meanings given above, is a convenient route to biurets of this particular nature, which have not previously been described in the literature or which cannot ordinarily be prepared, and which are useful as pesticidal, bacteriocidal, insecticidal and miticidal agents.

Resins of improved properties can be made from these silylated ureas and silylated biurets by reaction with aldehydic compositions such as formaldehyde, acetaldehyde, etc., which can then be combined advantageously with fillers to give molding compositions finding use in the decorative and insulating arts. Such resins can be used advantageously as arc chute materials to take advantage, not only of the inert silicon present in the composition but also of the large quantities of nitrogen which are found in such resins and which are exceptionally suitable for extinguishing electric arcs.

It is possible to convert the silylated biuret derivatives to the non-silylated state without producing the triorganosilanol by effecting reaction between the silylated biuret and an amine in accordance with the following equation where R, R', R'', R''' have the meanings given above.

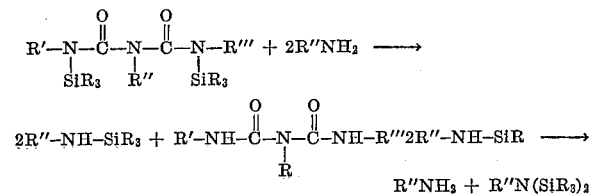

The silylated amine can then be employed to make new silylated ureido compounds.

What I claim as new and desire to secure by Letters Patent of the United States is:

1. A ureido compound selected from the class consisting of

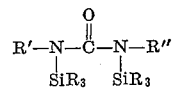

and

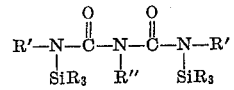

where R, R', and R'' are monovalent hydrocarbon radicals.

2. The compound N,N'-dimethyl-N,N'-bis(trimethylsilyl)urea.

3. The compound N,N'-diphenyl-N,N'-bis(trimethylsilyl)urea.

4. The compound N-methyl-N'-phenyl-N,N'-bis(trimethylsilyl)urea.

5. The compound N,N',N'' - trimethyl - N,N'' - bis-(trimethylsilyl) biuret.

6. The compound N,N'' - diphenyl - N' - methyl - N, N''-bis(trimethylsilyl) biuret.

7. The process for making ureido compounds which comprises effecting reaction between 1 to 2.4 moles of an organic isocyanate of the formula R'NCO and 1 to 1.2 moles of a triorganosilylated amine of the formula

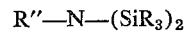

where R, R', R'' are monovalent hydrocarbon radicals.

8. The process as in claim 7 in which the organic isocyanate is methylisocyanate and the silyl amine is bis-(trimethylsilyl)methyl amine.

9. The process as in claim 7 in which the isocyanate is phenylisocyanate and the amine is bis-(trimethylsilyl) methyl amine.

10. The process as in claim 7 in which the isocyanate is phenylisocyanate and the silylated amine is bis(trimethylsilyl) aniline.

11. The process as in claim 7 in which the isocyanate is methylisocyanate and the silylated amine is bis-(trimethylsilyl)methyl amine in a molar ratio of 2 mols of the isocyanate per mol of the amine.

12. The process as in claim 7 in which the ingredients and molar proportions of the latter are in the ratio of at least 2 mols phenylisocyanate and 1 mol bis-(trimethylsilyl)methyl amine.

References Cited

UNITED STATES PATENTS

| 2,907,782 | 12/1959 | Pike | 260—448.2 |
| 3,172,874 | 3/1965 | Klebe | 260—448.2 |
| 3,208,971 | 9/1965 | Gilkey et al. | 260—448.2 |

FOREIGN PATENTS

| 1,356,088 | 5/1963 | France. |

TOBIAS E. LEVOW, *Primary Examiner.*

P. F. SHAVER, *Assistant Examiner.*